(12) United States Patent
Roodenrijs et al.

(10) Patent No.: US 6,467,305 B1
(45) Date of Patent: Oct. 22, 2002

(54) METHOD AND APPARATUS FOR CRYSTALLIZATION FROM LIQUIDS

(75) Inventors: Jacobus Petrus Roodenrijs, St. Michielsgestel; Halbe Anne Jansen, Maren Kessel, both of (NL)

(73) Assignee: Niro Process Technology B.V., S'-Hertogenbosch (NL)

( * ) Notice: Subject to any disclaimer, the term of this patent is extended or adjusted under 35 U.S.C. 154(b) by 0 days.

(21) Appl. No.: 09/597,898

(22) Filed: Jun. 19, 2000

(30) Foreign Application Priority Data

Jun. 17, 1999 (NL) .............................. 1012380

(51) Int. Cl.[7] .............................................. B01D 9/04
(52) U.S. Cl. ...................................................... 62/541
(58) Field of Search .......................... 62/532, 541, 123

(56) References Cited

U.S. PATENT DOCUMENTS

| | | | |
|---|---|---|---|
| 2,516,832 A | | 7/1950 | Rosenbloom |
| 4,459,144 A | * | 7/1984 | Van Pelt et al. .............. 62/541 |
| 6,247,321 B1 | * | 6/2001 | Roodenrijs ................... 62/123 |

* cited by examiner

*Primary Examiner*—William C. Doerrler
*Assistant Examiner*—Malik N. Drake
(74) *Attorney, Agent, or Firm*—Young & Thompson

(57) ABSTRACT

An installation for crystallizing a liquid from a solution, for example for freeze-concentrating effluent, having a nucleation zone, a ripening zone and a separator where the nucleation zone is constructed as a vacuum crystalline, such that the installation is of relatively simple and inexpensive construction, can easily be scaled up and is suitable for concentrating liquids containing undissolved particles, such as, for example, precipitated salts.

15 Claims, 1 Drawing Sheet

METHOD AND APPARATUS FOR CRYSTALLIZATION FROM LIQUIDS

BACKGROUND OF THE INVENTION

The application relates to an installation for the crystallisation of a liquid from a solution, a mixture of liquids or a suspension, comprising:

a nucleation zone for forming seed crystals, with a feed line for supplying mother liquor to the nucleation zone, a ripening zone in fluid communication with the nucleation zone for making the seed crystals grow and a separator connected to a discharge from the ripening zone for separating crystals and mother liquor.

DESCRIPTION OF THE RELATED ART

An installation of this type for freeze-concentrating aqueous substances such as fruit juice, beer, tea or coffee is disclosed in U.S. patent application No. 4,459,144 in the name of the Applicant. With this installation the aqueous liquid is fed to a surface-scraped heat exchanger. The surface-scraped heat exchanger forms a nucleation zone in which seed crystals are formed which are between 5 and 10 micrometers in size. The seed crystals are transferred from the surface-scraped heat exchanger to a growth zone in a separate adiabatically stirred ripening vessel where the average crystal size increases to approximately 300 micrometers. The ice containing slurry from the ripening vessel is fed to a separator for separating the crystals and the solution, which separator in this case consists of a washing column. Via a filter in the ripening vessel in the first stage the solution is recirculated through the surface-scraped heat exchanger associated with the ripening vessel and a portion is fed to the second stage of the freeze-concentrator, which again has a surface-scraped heat exchanger as nucleation zone and a ripening vessel as growth zone. The ice containing slurry formed in the ripening vessel of the second stage is fed to the ripening vessel of the first stage, the ice containing slurry moving in counter-current to the solution. The final concentration of the concentrated product discharged from the third stage can be approximately 50% (m/m) dissolved solids.

In the nucleation zone the seed crystals are produced by extracting heat from the liquid within a short time. During this operation some of the liquid is converted to crystals. For this purpose the residence time of the liquid in the nucleation zone must be short and high temperature differences between the scraped surface and the liquid must be employed. Thus, the liquid content of the nucleation zone must be low. As a consequence of the low surface temperature, crystals are produced on the surface of the nucleation zone, such that these crystals have to be scraped off at a high frequency.

In the known surface-scraped heat exchangers the scrapers are mounted on a rotary shaft. The shaft itself is constructed as an impeller along the heat-exchange surface, with a narrow gap between the surface and the rotor, such that the liquid volume is as small as possible and a short residence time is obtained. For heat-exchange surface areas of up to about 1 $m^2$, heat exchangers of this type are available commercially. For larger installations, however, 20 heat exchangers, for example, each with a surface area of 12 $m^2$, can be needed. Because of the low tolerances in respect of the gap for the rotary scraper and the high degree of dimensional and shape accuracy, as well as the high demands in respect of running and wear characteristics of the scrapers, surface-scraped heat exchangers are very expensive. Moreover, because of the special construction process and the machining operations required the ability to obtain them is uncertain.

The use of surface-scraped heat exchangers on a larger scale is also problematical. For a ripening vessel with a capacity of 36 $m^3$ it is possible to use a heat-exchange surface area of 24 $m^2$ in the nucleation zone. With a circulation stream through the nucleation zone and the ripening zone of 72 $m^3$/hour (that is to say the content of the zones is passed twice per hour over the heat-exchange surface), 36 tonnes of filter cake must be re-suspended per hour if a filter is used in the ripening zone. A residence time of 10 seconds in the heat exchanger means that the heat exchanger has a capacity of 200 litres. This means that a gap width of at most 8 mm can be used for a total surface area of 24 $m^2$. If the stream impinges on the heat-exchange surface in the widthwise direction, all ice formed must be discharged without problems over the longitudinal direction through the 8 mm gap, in which the scrapers are also accommodated. This constitutes a major problem when scaling up.

SUMMARY OF THE INVENTION

Therefore, one aim of the present invention is to provide a crystallisation installation for separating off and purifying liquids from a solution, a mixture of liquids or a suspension, such as, for example, effluent, with which installation the nucleation zone is of relatively simple construction, is relatively inexpensive and can be scaled up in a simple manner.

To this end the installation according to the present invention is characterised in that the nucleation zone comprises a vacuum crystalline. It has been found that seed crystals for feeding to the ripening zone can be formed in a simple manner by means of a vacuum crystalline. Using a vacuum crystalline known per se seed crystals in the desired size range of between 3 and 10 micrometers can be obtained with residence times and heat extraction per unit time which correspond to those in a scraped heat exchanger. Moreover, if the mother liquor contains undissolved particles, such as, for example, precipitated salts, it is possible to obtain relatively high percentage ice contents with the vacuum crystalline, which is not achievable with a scraped heat exchanger because of the small gap dimensions.

It is pointed out that a vacuum crystalline is known per se from, for example, U.S. Pat. No. 1,865,614. Such a vacuum crystalline can be used in the installation according to the present invention. The nucleation zone and ripening zone can each be located in a separate vessel. The separator preferably comprises a washing column, such as, for example, is described in NL-A 7 106 457.

The vacuum crystalline can consist of a single vessel that can be connected selectively to two ice condensers. The first ice condenser is able to remove the water vapour from the nucleation vessel by freezing said vapour in contact with a cooling coil. After a predetermined period the ice formed on the cooling element will be removed with the aid of steam, the first condenser of the nucleation vessel being shut off, whilst the second ice condenser is connected to the nucleation vessel. However, it is also possible to use two nucleation vessels, each nucleation vessel provided with its own, preferably integral, ice condenser.

In one embodiment the nucleation zone is provided with a line for feeding a heating medium to the nucleation zone in order to prevent ice crystals forming on the surface of the nucleation zone. The heating medium can remove heat from the feed or can be made up of the feed itself by, for example, feeding a line system for the feed over the wall of the nucleation vessel before supplying the feed to the feed vessel.

BRIEF DESCRIPTION OF THE DRAWINGS

A few embodiments of an installation and method according to the present invention will be explained in more detail with reference to the appended drawing, in which.

DESCRIPTION OF THE PREFERRED EMBODIMENTS

Figure 1:
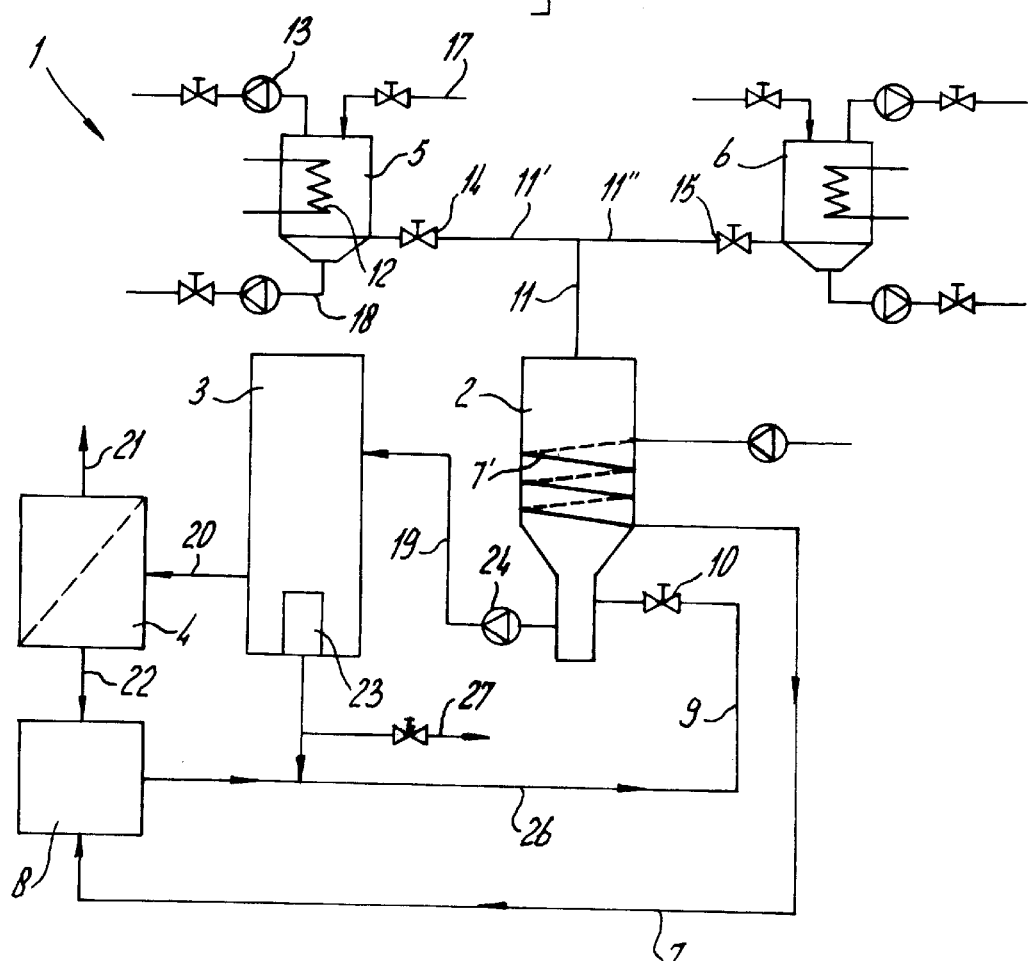
FIG. 1 shows an installation according to the present invention with a single nucleation vessel and two ice condensers.

FIG. 1 shows an installation 1 according to the present invention having a nucleation vessel, which comprises a vacuum crystalline 2, a ripening vessel 3, a washing column 4 and two ice condensers 5, 6. A liquid, such as, for example, effluent, fruit juice or coffee, which has to be concentrated is fed via a feed line 7 to a container 8. From the latter the liquid is fed via a feed line 9 and a shut-off valve 10 to the vacuum crystalline 2. The vacuum crystalline 2 is in communication with one of the ice condensers 5 or 6 via vapour discharge line 11, which branches into lines 11' and 11". When the shut-off valve 14 is opened the ice condenser 5 freezes the vapour fed to the latter in contact with a cooling coil 12. Via a vacuum pump 13 the non-condensed gases are discharged from the condenser 5, for example to an incinerator, or are condensed and added to the end product. When the cooling coil 12 is coated with an ice layer of predetermined thickness, the shut-off valve 14 is closed and the shut-off valve 15 of the condenser 6 is opened. Steam is then introduced into the condenser 5 via a steam feed line 17, such that the vapour frozen in contact with the coiling coil 12 is melted. The condensate and the melt are removed from the condenser 5 via a discharge line 18, whilst water vapour freezes in contact with the cooling coil of the condenser 6.

By means of the condensers 5, 6 the pressure in the nucleation vessel 2 is lowered to, preferably, between $10^{-4}$ and $7.10^{-3}$ bar. Seed crystals between 3 and 10 micrometers in size form in the nucleation vessel 2 and are fed by a pump 24 via a discharge line 19 to the ripening vessel 3 in order to grow in the latter to a size of a few hundred micrometers. From the ripening vessel 3 crystal slurry is fed via a discharge line 20 to the washing column 4, from which water is separated off via line 21 and concentrated mother liquor is fed to the container 8 via line 22. Mother liquor is discharged from ripening vessel 3 via a filter 23 and recirculated through feed lines 26 and 9 through nucleation zone 2. Concentrated end product is tapped off via discharge line 27.

The feed line 7, which opens into the container 8, contains a line section 7' which extends in spiral form around the vessel 2. In this way heat is extracted from the feed and the wall of the vessel 2 is prevented from reaching a temperature such that crystals deposit thereon.

Figure 2:
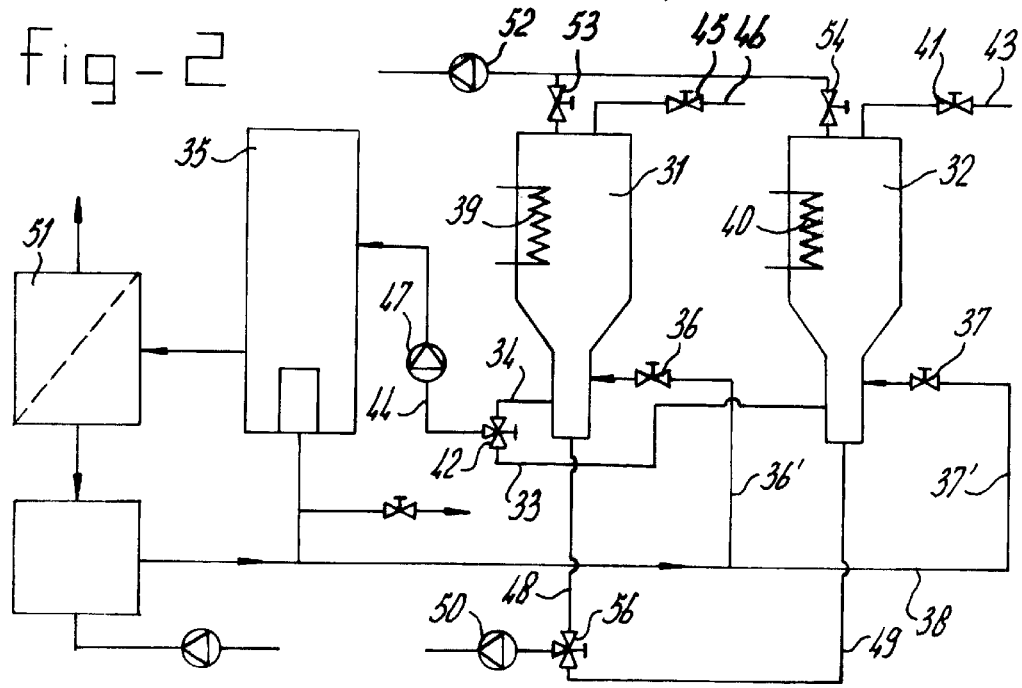
FIG. 2 shows an alternative embodiment with two nucleation vessels, each provided with its own integral ice condenser.

FIG. 2 shows an embodiment with two nucleation vessels 31, 32 having an integral ice condenser, which are connected via respective discharge lines 33, 34 to a ripening vessel 35. The discharge lines 33, 34 are connected via a shuttle valve 42, a joint discharge line 44 and a pump 47 to the ripening vessel 35 that is connected to washing column 51. Each nucleation vessel 31, 32 is provided with a feed line 36', 37' with a respective shut-off valve 36, 37 for connecting one of the nucleation vessels 31, 32 to the feed line 38. The nucleation vessels 31, 32 are connected via lines 48 and 49 to a shuttle valve 56 and to a pump 50 for discharging condensate and the melt from the cooling coils 39, 40.

When the nucleation vessel 31 is connected via shut-off valve 36 to the feed line 38, the shut-off valve 37 will be closed. The shut-off valve 53 is opened so that the nucleation vessel 31 is connected to the vacuum pump 52 and is brought under reduced pressure, whilst the shut-off valve 54 of the second nucleation vessel 32 is closed. The shut-off valve 45 of the steam feed line 46 is likewise closed, whilst the shut-off valve 41 of the steam feed line 43 is opened to remove ice from the cooling coil 40 of the vessel 32. When the cooling coil 40 has been thawed and ice has deposited on the cooling coil 39 of vessel 31, shut-off valve 36 can be closed and shut-off valve 37 can be opened, after which the cooling coil 39 can be thawed and vapour can be removed from nucleation vessel 32.

What is claimed is:

1. Installation for the crystallisation of a liquid from a solution, a mixture of liquids or a suspension, comprising:
   a nucleation zone (2, 31, 32) for forming seed crystals, with a feed line (9, 26, 36', 37', 38) for supplying mother liquor to the nucleation zone,
   a ripening zone (3, 35) in fluid communication with the nucleation zone for making the seed crystals grow and
   a separator (4) connected to a discharge (20) from the ripening zone for separating crystals and mother liquor, characterised in that the nucleation zone (2, 31, 32) comprises a vacuum crystalline.

2. Installation according to claim 6, characterised in that the nucleation zone comprises a nucleation vessel that is connected by a discharge (19, 33, 34) to the ripening zone located in a ripening vessel.

3. Installation according to claim 6, characterised in that the vacuum crystalline is connected via a first vapour discharge line (11'), that can be shut off, to a first condenser (5) and via a second vapour discharge line (11"), that can be shut off, to a second condenser (6).

4. Installation according to claim 2, characterised in that two nucleation vessels (35, 36) are each connected via a respective feed line (36', 37'), which can be shut off, to a feed (38) for mother liquor and are each connected via a respective discharge to the ripening vessel (35), each nucleation vessel being provided with its own condenser (39, 40).

5. Installation according to claim 3, characterised in that the first condenser (5, 6, 39, 40) is an ice condenser having a condenser vessel with, incorporated therein, a cooling element (12), a feed line (17, 43, 46) for a heating medium, which feed line can be shut off, a vacuum pump (13, 52), connected to the condenser vessel, and a discharge line (18, 48, 49) for discharging condensate and melted ice from the condenser vessel.

6. Installation for the crystallisation of a liquid from a solution, a mixture of liquids or a suspension, comprising:
   a nucleation zone (2, 31, 32) for forming seed crystals, with a feed line (9, 26, 36', 37', 38) for supplying mother liquor to the nucleation zone ,
   a ripening zone (3, 35) in fluid communication with the nucleation zone for making the seed crystals grow and
   a separator (4) connected to a discharge (20) from the ripening zone for separating crystals and mother liquor, characterised in that the nucleation zone (2, 31, 32) comprises a vacuum crystalline, characterised in that the wall of the nucleation zone (2) is provided with a line (7') for feeding a heating medium to the nucleation zone.

7. Installation according to claim 6, characterised in that a feed line 7 for the feed is fed over the wall of the nucleation zone (2) or is in heat-exchanging contact therewith.

8. Installation for the crystallisation of a liquid from a solution, a mixture of liquids or a suspension, comprising:

a nucleation zone (2, 31, 32) for forming seed crystals, with a feed line (9, 26, 36', 37', 38) for supplying mother liquor to the nucleation zone, a ripening zone (3, 35) in fluid communication with the nucleation zone for making the seed crystals grow and a separator (4) connected to a discharge (20) from the ripening zone for separating crystals and mother liquor, characterised in that the nucleation zone (2, 31, 32) comprises a vacuum crystalline, characterised in that the nucleation zone (2, 31, 32) is of a size such that the residence time of the liquid in the nucleation zone is no longer than 100 s.

9. Installation according to claim 8, characterised in that the separator (4, 51) comprises a washing column.

10. Method for crystallizing a liquid from a solution, a mixture of liquids or a suspension, comprising feeding mother liquor to a nucleation zone (2, 31, 32) in order to form seed crystals, discharging the seed crystals from the nucleation zone to a ripening zone (3, 35) in order to make the seed crystals grow, and feeding the contents of the ripening zone to a separator (4, 51), characterised in that the nucleation zone is operated under a pressure of less than $7*10^{-3}$ bar wherein the nucleation zone is sized such that the residence time of the liquid in the nucleation zone is no longer than 100 s.

11. Method according to claim 10, characterised in that the mother liquor contains undissolved components.

12. Method according to claim 10 or 11, characterised in that the nucleation zone comprises two nucleation vessels (31, 32) each of which is provided with its own ice condenser (39, 40), a crystal slurry being fed from a first nucleation vessel (31) to the ripening zone (35) and coolant being fed to the condenser (39) of the first nucleation vessel while no feed of crystal slurry from the second nucleation vessel (32) to the ripening vessel (35) is taking place and a heating medium being fed to the condenser (40) of the second nucleation vessel, after which crystal slurry is then fed from the second nucleation vessel (32) to the ripening vessel (35) and coolant is fed to the condenser (40) of the second nucleation vessel while the feed of crystal slurry from the first nucleation vessel (31) to the ripening vessel is interrupted and a heating medium is fed to the condenser (39) of the first nucleation vessel (31).

13. The method of claim 10, wherein the nucleation zone is sized such that the residence time of the liquid in the nucleation zone is no longer than 50 s.

14. The method of claim 10, wherein the nucleation zone is sized such that the residence time of the liquid in the nucleation zone is no longer than 30 s.

15. The method of claim 10, wherein the nucleation zone is operated under a pressure between $10^{-4}$ bar and $10^{-7}$ bar.

* * * * *